Sept. 22, 1970    J. KEIZER    3,530,452
TEMPERATURE RATE OF CHANGE SENSOR
Filed July 28, 1967

INVENTOR.
JAN KEIZER
BY
Meyer, Tilberry & Body
ATTORNEYS.

United States Patent Office 3,530,452
Patented Sept. 22, 1970

3,530,452
TEMPERATURE RATE OF CHANGE SENSOR
Jan Keizer, Upper Darby, Pa., assignor, by mesne assignments, to Gulf + Western Industries, New York, N.Y., a corporation of New York
Filed July 28, 1967, Ser. No. 656,784
Int. Cl. G08b *17/06;* H01h *37/46*
U.S. Cl. 340—227.1                                    10 Claims

ABSTRACT OF THE DISCLOSURE

The specification discloses an apparatus for giving an indication when the rise in ambient temperature exceeds a predetermined rate. Two specific embodiments of the invention are disclosed. The first comprises an elongated, laminated composite member mounted in cantilever fashion and arranged so that movement of its free end closes an electric circuit. The member is formed from two strips of dissimilar materials joined together throughout their length. The materials are chosen so as to have relatively equal coefficients of thermal expansion but substantially different coefficients of thermal conductivity. Consequently, during a gradual temperature rise both materials will effectively expand an equal amount and the free end of the member will not move; however, upon a rapid temperature rise the material having the highest coefficient of thermal conductivity will heat up faster and, correspondingly, expand faster. This produces a lateral deflection of the free end of the member to close the circuit. The second embodiment is generally the same as the first in construction and operation; however, the sensing element is coiled into a flat spiral with the outer end fixed and the inner end arranged for actuating an alarm circuit.

---

The present invention is directed toward the art of temperature sensors and, more particularly, to an improved apparatus responsive to rate of change of temperature.

The invention is particularly suited for use in fire alarm systems and will be described with particular reference thereto; however, it will be appriciated the invention is capable of broader application and could be utilized wherever it is desired to sense, or produce a signal indicative of, a change in ambient temperature exceeding a predetermined rate, e.g. ten degrees per minute.

In the art of fire alarm systems it is common practice to utilize rate of temperature rise detectors or sensors to close an alarm circuit whenever the rate of ambient temperature rise exceeds a predetermined number of degrees per minute. By utilizing rate of temperature rise as the controlling factor to indicate the presence of a fire, the system can thus give an indication without waiting until the ambient temperature at the sensors location has reached any predetermined minimum level.

Generally, the sensors utilized in the above systems have been of two types. The first type includes an air chamber vented through a calibrated vent and having at least one wall formed by a flexible diaphragm. The diaphragm is arranged so that outward movement closes a pair of normally open contacts. The vent is sized so that during a normal temperature rise, such as produced by a building heating system, the expansion of the air within the chamber can easily be vented. However, the vent is sized small enough so that when the temperature rise exceeds a predetermined rate the expansion of the air in the chamber is more rapid than can be vented and the diaphragm is deflected outwardly to close the contacts. A second type of sensor often utilized comprises a pair of spaced bi-metal elements mounted in cantilever fashion in parallel and having electrical contacts carried or actuated by their free ends. One of the bi-metals is insulated while the other is uninsulated. During a gradual temperatuer rise both bi-metals will deflect uniformly since the affect of the insulation is of little significance during a slow temperature change. However, if there is a rapid temperature rise the uninsulated bi-metal will be heated much more rapidly than the insulated one. Consequently, during rapid temperature change the free end of the uninsulated bi-metal will deflect into engagement with the free end of the insulated bi-metal to thereby close the electrical contacts.

Although both of the previously used types of sensors have been generally satisfactory, they have certain drawbacks. For example, both are relatively somewhat complicated and expensive. Additionally, the operation of the air chamber type is influenced by changes in atmospheric pressure.

The present invention provides a rate of temperature rise detector which is highly simplified and is not influenced by changes in atmospheric pressure. Further, because of its simplicity, the deflector is easily and inexpensively manufactured.

In accordance with the present invention there is provided a rate of temperature change responsive device which includes an elongated composite member having portions of dissimilar materials which have substantially similar coefficients of thermal expansion and substantially different coefficients of thermal conductivity. The portions are joined together in a manner such that flexure of the member will be effected by a difference in thermal expansion between the portions resulting from a more rapid heating of the portion having the highest coefficient of thermal conductivity during a predetermined rate of temperature change.

As is apparent, because the portions have substantially similar coefficients of thermal expansion, any slow and gradual temperature changes will produce equal expansion of the portions, and consequently, the member will not flex. However, it there is a rapid temperature rise or fall, the portion of highest coefficient of thermal conductivity will be more rapidly affected and expand or contract at an accordingly more rapid rate. This produces flexure of the member which is somewhat proportional to the rate of temperature change. Because of this, the device can be readily arranged to actuate an indicating or alarm device at substantially any rate of temperature change.

As is apparent, because the subject device requires only a single bi-metal-type element it can be extremely simple in construction and will not be affected by atmospheric pressure changes.

Accordingly, a primary object of the present invention is the provision of a highly simplified rate of temperature change responsive device.

Another object of the present invention is the provision of a rate of temperature change responsive device which is useful in fire alarm systems.

A still further object of the present invention is the provision of a rate of temperature change responsive device which is not effected by ambient pressure changes.

Yet another object is the provision of an ambient temperature change responsive device which utilizes a single sensing member which is substantially unaffected by slow and gradual temperature changes.

These and other objects and advantages will become apparent from the following description when read in conjunction with the accompanying drawings wherein.

Figure 1:
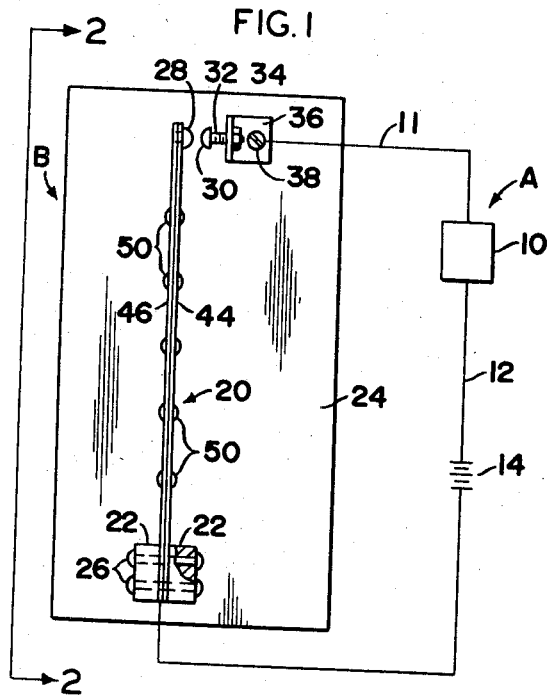
FIG. 1 shows the overall arrangement of a fire detector system A including a rate of temperature rise sensor B formed in accordance with the preferred embodiment of the present invention.

Referring now to the drawings wherein the showings are for the purpose of illustrating a preferred embodiment of the invention only and not for the purpose of limiting same, FIG. 1 shows the overall arrangement, somewhat diagrammatic, of a fire alarm or indicating system A incorporating a rate of temperature change sensor B formed in accordance with the preferred embodiment of the present invention.

The arrangement and construction of the fire alarm or indicating system A is not important to the present invention and has been illustrated merely to show one specific environment in which the sensor B is useful. As shown, the alarm or indicating system A preferably includes an indicating member 10 which could, for example, be a signal light or alarm bell connected in a circuit comprised of electrical leads 11 and 12. A battery 14 is shown in lead 12 and functions to supply the current necessary for actuating the indicator 10.

Connected between leads 11 and 12 is the improved temperature rate of change sensor B. Sensor B is arranged to complete the circuit between leads 11 and 12 in response to the ambient temperature changing at a rate above a predetermined minimum. As previously discussed, rate of temperature change sensors are frequently used to give an early indication of the presence of fire. The use of a rate of temperature change type sensor is preferable because it can sense the presence of fire as indicated by a rapid temperature change prior to the ambient temperature reaching any predetermined minimum as required by fusible link and fixed temperature sensing devices. Additionally, however, a standard fixed type temperature sensor could be connected in parallel with sensor B to give an indication of ambient temperature reaching a predetermined minimum.

According to the preferred embodiment of the present invention the temperature rate responsive sensor B includes an elongated composite flexible member indicated generally by the reference numeral 20. Member 20 is mounted in cantilever fashion by having its lower end supported between a pair of insulated support blocks 22 which extend outwardly from a base member 24. The member 20 is connected to support blocks 22 by a pair of horizontally extending rivets or screws 26.

An electrical contact 28 is carried on the upper end of member 20. A similar contact 30 is adjustably mounted by virtue of a threaded shank 32 and a nut 34, on a bracket 36 which extends outwardly from base member 24. Lead 11 is electrically connected with bracket 36 by a screw 38. The lead 12 is electrically connected with contact 28 by being connected through a first portion 42 of member 20 which is electrically conductive. As is apparent, flexure of member 20 to bring contact 28 in engagement with contact 32 completes the circuit for supplying electrical energy to indicator 10.

Of particular importance to the present invention is the construction of member 20 which produces a flexure of the member in response to a rate of temperature change exceeding a predetermined minimum. As shown, member 20 is formed from a pair of strips 44 and 46 which are joined in abutting relationship throughout their lengths. The materials from which strips 44 and 46 are formed are chosen so as to have substantially identical coefficients of thermal expansion but substantially different coefficients of thermal conductivity. In the arrangement shown, strip 46 would preferably have a thermal conductivity substantially greater than strip 44.

As will be apparent, during a gradual temperature rise of, for example, from 0 to 7 or 8° F. per minute, both strips 44 and 46 will be relatively uniformly heated and, because of their equal coefficients of thermal expansion, expand a similar amount. However, should the rate of change of the ambient temperature be substantially larger, for example, in the range of from 10 to 15° per minute, the substantially greater coefficient of thermal conductivity of strip 46 will cause, or allow, strip 46 to heat up at a materially faster rate than strip 44. This will cause strip 46 to expand more rapidly than strip 44 and produce a flexure of member 20 to the right in the manner of a conventional bi-metal element.

The amount of flexure of element 20 is, to a degree, proportional to the rate of temperature change. Consequently, by adjusting the spacing between contacts 28 and 32 it is possible to adjust the rate of temperature rise required to cause actuation of indicator 10.

Obviously, a variety of different combinations of materials have the characteristics required for member 20. Additionally, the strips 44 and 46 could be joined or bonded together in a variety of different ways. According to the preferred embodiment, however, strip 46 is formed from copper, while strip 44 is formed from glass filled nylon. Additionally, as shown, the strips are joined in relatively immovable relationship by a plurality of transversely extending rivets 50.

The combination of glass filled nylon and copper is suited to this device because the glass filled nylon can be compounded in well known manner so as to have a coefficient of thermal expansion of approximately $1.7 \times 10^{-5}$ in./in./° C., which is the generally accepted value of the coefficient of expansion for copper. Additionally, the copper has a coefficient of thermal conductivity of approximately .94 cal./sec./sq. cm./° C./cm. as compared to a coefficient of thermal conductivity of in the range of 1.5 to $1.7 \times 10^{-4}$ cal./sec./sq. cm./° C./cm. for the glass filled nylon. This combination of materials thus produces an element which is highly sensitive to rate of temperature change.

Figure 2:
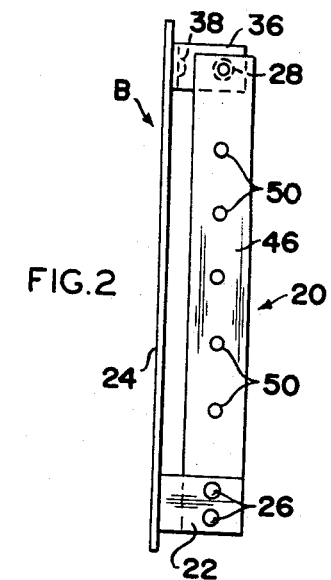
FIG. 2 is a view taken on line 2—2 of FIG. 1.

As is apparent, a large number of variations and modifications of the sensor of the FIGS. 1 and 2 embodiment are possible. For example, rather than having the free end of member 20 directly close the circuit, it could be arranged to act through a motion multiplying and/or snap-acting mechanism to close the circuit. Additionally, the sensor could be provided with a housing arranged so as to cause the ambient air to effectively engage only the surface of the portion having the higher coefficient of thermal conductivity. The desirability and usefulness of such arrangements would, however, be dependent on the use and/or environment contemplated for the sensor.

Figure 3:
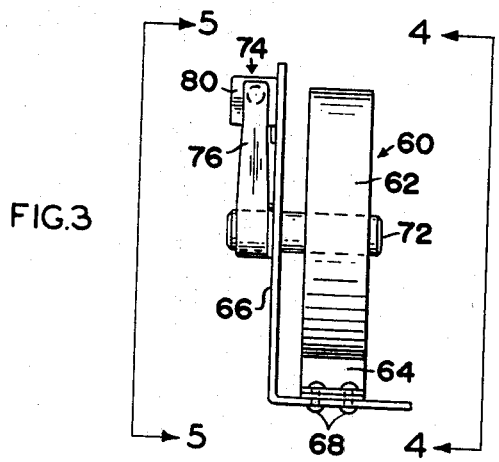
FIG. 3 is an elevational view of a second embodiment of a temperature rate of change sensor formed in accordance with the present invention.
Figure 4:
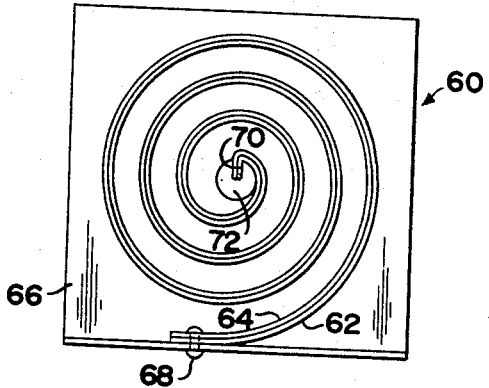
FIG. 4 is a view taken on line 4—4 of FIG. 3.
Figure 5:
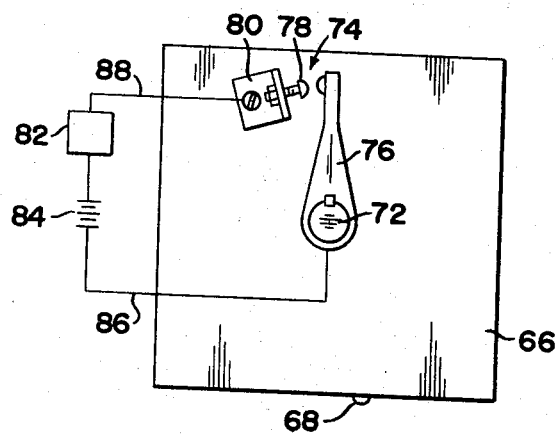
FIG. 5 is a view taken on line 5—5 of FIG. 3.

FIGS. 3–5 show a second embodiment of a rate of change sensor formed in accordance with the present invention. According to this embodiment the sensing member 60 is formed generally as described with reference to member 20 of FIGS. 1 and 2, but is coiled into the shape of a flat spiral.

As shown, member 60 comprises an elongated flexible element including first and second portions 62 and 64 formed from strips of different materials having substantially equal coefficients of thermal expansion but substantially different coefficients of thermal conductivity, as described with reference to the FIGS. 1 and 2 embodiment. The strips are joined together throughout their lengths in relatively immovable relationship by an epoxy resin cement. The portion 62 is of higher thermal conductivity so that upon a rapid temperature change it will expand or contract more rapidly than portion 64, to thereby produce a flexure of the spiral. This flexure, in the form of coiling or uncoiling, resulting from a rapid temperature change can be utilized by mounting the member 60 in a variety of ways. In the FIGS. 3–5 embodiment, the member 60 is mounted by having its outer end connected to an L shaped frame 66 by a pair of rivets 68. The inner end of the member is fixed in a slot 70 formed in a shaft 72 rotatably carried in the vertical portion of frame 66. As can be seen, the shaft 72 will be rotated in a counterclockwise direction (as viewed in FIG. 4) upon a rapid temperature rise. As shown in FIG. 5, the counterclockwise rotation of the shaft functions to close a switch 74 which includes an electrically conductive arm 76 positively connected to the end of the shaft, and an adjustable contact 78 carried by an insulated bracket 80 extending from frame 68.

The closure of the switch 66 is arranged to energize an alarm or indicator 82 connected in a circuit including a battery 84 and electrical leads 86 and 88 connected in the manner described with reference to the FIGS. 1 and 2 embodiment.

The two above-described embodiments of a temperature rate of change sensor formed in accordance with the present invention are obviously capable of substantial modification and alteration in construction and use, and it is my intention to include all such modifications and alterations as part of my invention insofar as they come within the scope of the appended claims.

Having thus described my invention, I claim:

1. A rate of temperature change responsive device including an elongated composite member having portions of dissimilar materials which have substantially similar coefficients of thermal expansion and substantially different coefficients of thermal conductivity, said portions being joined together such that flexure of said member will be affected by a difference in thermal expansion between said portions resulting from a more rapid heating of the portion having the highest coefficient of thermal conductivity during a predetermined rate of temperature rise.

2. A rate of temperature change responsive device as defined in claim 1 including indicating means actuated by a predetermined flexure of said member.

3. A rate of temperature change responsive device as defined in claim 1 wherein said member is flat and mounted in cantilever fashion.

4. A rate of temperature responsive device as defined in claim 1 wherein said member is in the form of a coil.

5. A rate of temperature responsive device as defined in claim 1 wherein said member has two of said portions of dissimilar material, with said portions extending throughout the length of said member and being joined in abutting relationship.

6. A rate of temperature change responsive device including an elongated composite member comprised of a first elongated strip and a second elongated strip being joined in relatively immovable abutting relationship throughout their lengths, said strips being formed from respectively different materials having relatively equal thermal coefficients of expansion, and substantially different thermal coefficients of conductivity.

7. A rate of temperature change responsive device as defined in claim 6 including indicating means actuable by flexure of said member.

8. A rate of temperature change responsive device as definfied in claim 6 wherein said first and second strips are equal width and joined by rivets.

9. A rate of temperature change responsive device as defined in claim 7 wherein said indicating means includes an adjustable switch means.

10. A method of indicating a rate of temperature rise which exceeds a predetermined minimum comprising the steps of (a) providing an elongated composite member having portions of dissimilar materials which have substantially similar coefficients of thermal expansion and substantially different coefficients of thermal conductivity with the portions being joined together such that flexure of the member will be effected by a difference in thermal expansion between the portions whenever the temperature rise is sufficiently rapid to cause the portion having the highest coefficient of thermal conductivity to heat up faster than the other portion;

(b) positioning said member in a space to respond to the ambient temperature therein; and, (c) providing means actuated by flexure of said composite member whenever the rate of temperature rise exceeds a predetermined minimum.

References Cited

UNITED STATES PATENTS

| | | | |
|---|---|---|---|
| 990,771 | 4/1911 | Poinan | 337—393 |
| 1,113,955 | 10/1914 | Carey. | |
| 2,573,685 | 11/1951 | Blinn et al. | 73—337 |
| 2,698,368 | 12/1954 | Lehr et al. | 340—227.1 X |
| 2,759,173 | 8/1956 | Hartzell et al. | 340—227.1 |
| 2,954,445 | 9/1960 | Hargreaves | 73—337 X |
| 3,312,398 | 4/1967 | Markham | 200—61.06 X |
| 3,335,608 | 8/1967 | Alban et al. | 73—337 |

ALVIN H. WARING, Primary Examiner

D. L. TRAFTON, Assistant Examiner

U.S. Cl. X.R.

337—393